Aug. 21, 1956     A. E. STRAUSSER     2,759,290
FISHING RIG
Filed Oct. 19, 1953
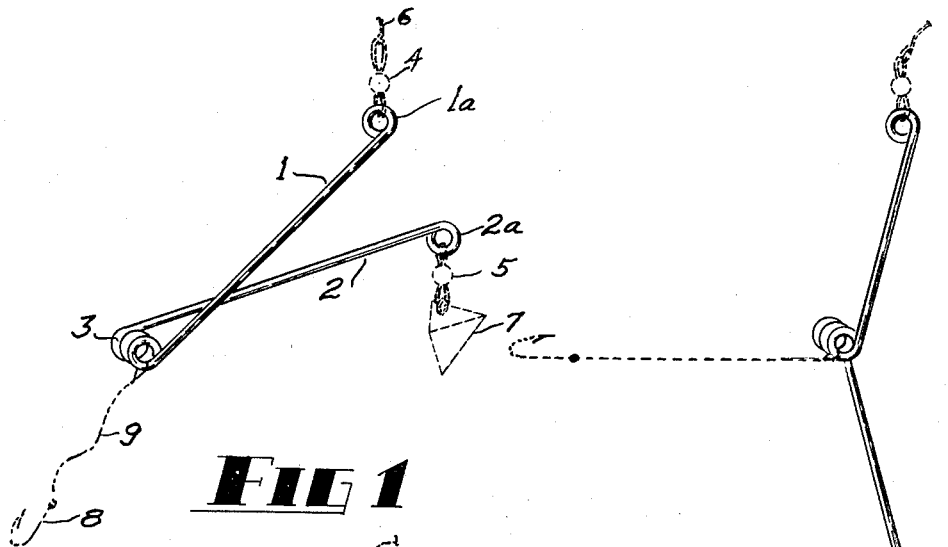
FIG 1
FIG 2
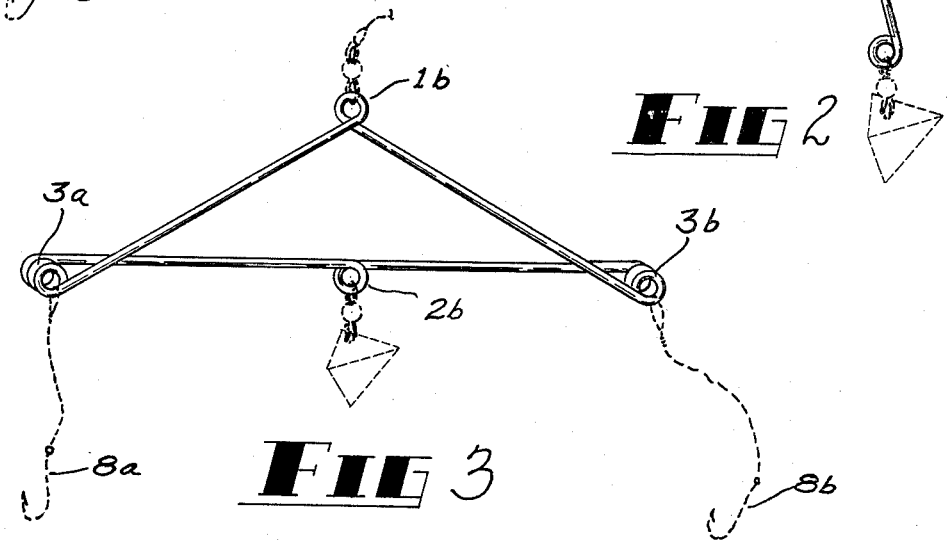
FIG 3
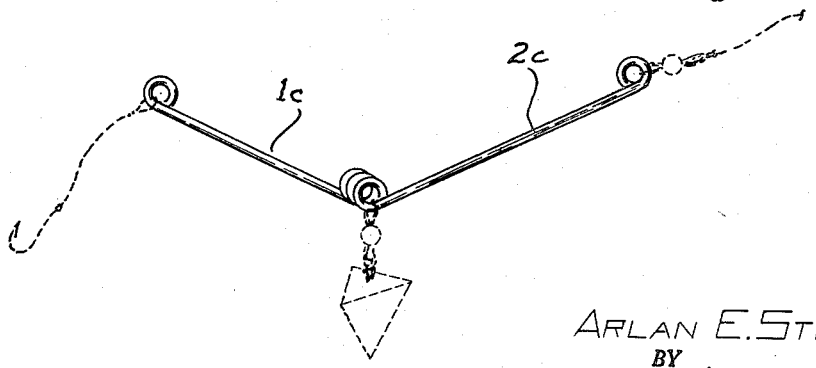
FIG 4
INVENTOR.
ARLAN E. STRAUSSER
BY
*William J. Ruano*
ATTORNEY

United States Patent Office 2,759,290
Patented Aug. 21, 1956

2,759,290

FISHING RIG

Arlan E. Strausser, Reading, Pa.

Application October 19, 1953, Serial No. 386,911

2 Claims. (Cl. 43—42.72)

This invention relates to a fishing rig and more particularly to one which is adapted to provide immediate tension on the hook to secure the hold on a fish that is hooked without disturbing the sinker, and which may be in the form of a multi-unit.

An outstanding disadvantage of conventional fishing rigs is that they are generally of rigid construction and of such design that pulling on the line will effect pulling on both the hook and sinker simultaneously. Thus the sinker is unnecessarily disturbed and might frighten the fish, also will require repostioning after each tug on the line, all of which is unsatisfactory and mitigates against success in hooking the fish.

An object of the present invention is to provide a fishing rig which is devoid of the above named disadvantages of conventional rigs and which is essentially in the form of a pivotally moveable spring element so arranged as to enable activating the hook and bait by tugging on the line without disturbing the sinker.

A further object of the invention is to provide a resilient fishing rig which may be used either singly or in combination with similar rigs, depending upon whether one hook or a plurality of hooks are to be connected thereto.

Other objects and advantages of this invention will become apparent from the following description taken with the accompanying drawing wherein:

Figure 1 is a top perspective view of a fishing rig embodying the principles of the present invention.

Figure 2 is a similar view of the rig shown in Figure 1 in a different position resulting from reeling in of the line after snapping by the fisherman.

Figure 3 shows a modification of the fishing rig for accommodating a pair of hooks.

Figure 4 is a further modification similar to the form shown in Figure 1 but in which the angle of the arms is greater than 90° to make the rig useful in trolling.

Referring more particularly to Figure 1 numerals 1 and 2 denote the arms of a fishing rig which are integrally joined together by a coiled spring portion 3. That is, portions 1, 2 and 3 may be made from a single piece of spring wire, preferably stainless steel which is lead coated to a dull finish. Arms 1 and 2 may be normally at an angle of about 30 or more degrees depending upon the type of fishing to be done. At the ends of arms 1 and 2 are eye portions 1a and 2a respectively onto which are connected swivels 4 and 5 which are connected to the line 6 and sinker 7, respectively. The hook 8 is connected by line 9 to the coil spring or apex of the angularly disposed arms 1 and 2. The spring wire used in forming the fishing rig may be made of different gauges of wire and coiled for different tensions, and the arms may be disposed at different angles, depending entirely upon the type of fishing. Moreover, different variations can be made by interchanging the hook, line and sinker to any of the three points 1a, 2a and 3 of the rig.

An outstanding feature of the construction shown is that arms 1 and 2 are pivotally connected by coil spring portion 3 so that upon lifting or tugging of line 6 the angle between arms 1 and 2 will be increased and portion 3 will be lifted so as to lift the hook without lifting the end or eye portion 2a of arm 2 onto which the sinker is attached. That is, sinker 7 may be kept stationary at or near the bottom of a stream and slight tugging on the wire will merely cause the hook to bob up and down without disturbing the position of the sinker. This is highly advantageous since it enables the fisherman to apply immediate tension on line 9 which carries the hook to securely hook and hold the fish. The first action when the bait is struck and seized by the fish is immediate tension at all three points of the rig. The resiliently connected arms also give an extra snap in casting which tends to catapult the rig end of the line, giving added distance to the cast.

While I have shown several coils forming portion 3 of the pivotal connection between arms 1 and 2 it will be apparent that a single coil may be used, or, in some instances, no coil at all if the arms are sufficiently resilient or are connected by a sufficiently resilient connecting portion.

Figure 2 shows the position of the rig of Figure 1 when the line is snapped by the fisherman and reeled in. It will be noted that a direct pull with a slight twisting motion is exerted directly away from the striking fish.

Figure 3 shows a modification of the rig shown in Figure 1 wherein two different coil spring portions 3a and 3b are provided at the corners of a triangle formed by the spring wire. The hook supporting eye portion 1b fastened to the line is located at the apex of the triangle. Thus, a pair of hooks 8a and 8b may be secured to the respective corners of the triangular rig. A construction similar to Figure 3 may also be assembled by joining two units of the construction shown in Figure 1, that is, by joining the respective eyes 1a and 2a. More than two units may also be joined together or with the unit shown in Figure 3 in case more than two hooks are to be fastened to the rig.

Figure 4 shows a further modification which is almost identical in construction with that shown in Figure 1 except that the arms 1c and 2c are disposed at an angle greater than 90° to make the rig useful in trolling. By using different weights of sinkers trolling may be done at different depths.

It will be seen that in the various modifications, the fundamental characteristic of the rig is to provide arms which are resiliently connected together so that the arms may be pivotally moveable resiliently about their joining portion or connection so that tension may be maintained during bobbing of the line. Fundamentally to catch fish tension must be maintained at all times either by the spring of the fishing rod or by some other means. The present invention provides such other means which greatly aids in accomplishing this purpose, for it is known that after a fish is hooked so long as the line is maintained under tension, it is very difficult for the fish to become released, but if tension is not continually maintained it is rather easy for the fish to become unhooked.

Thus it will be seen that I have provided an efficient fishing rig of spring wire, angular construction which will enable constant bobbing or activating of the bait without disturbing the sinker, therefore requiring very light pulling or tugging by the fisherman and avoiding needless effort; also I have provided a fishing rig which is so constructed that a pull on the line will directly effect a pull on the hook long before influencing the position of the sinker; furthermore I have provided a fishing rig which is relatively simple and inexpensive in construction and which is readily adapted to be connected in mutiple whenever two or more hooks are to be joined thereto.

While I have illustrated and described two embodiments of my invention, it will be understood that these are by way of illustration only, and that various changes and modifications may be made within the contemplation of my invention and within the scope of the following claims.

I claim:

1. In combination with a fish hook, line and sinker, a fishing rig comprising a single piece of spring wire bent centrally into a helical coil and having two straight arm portions integral with the opposite end portions of said coil and being of substantially equal length, each arm portion terminating in a single eye, one of said eyes being connected to said line and the other to said sinker, said coil being connected to said hook, there being no other interconnection between said eyes, said arms being disposed at an angle of at least about 30°, whereby the arms may be freely and yieldingly stretched apart to an angle substantially greater than 30° as the result of pulling movements by said line and winding up of said coil.

2. A fishing rig comprising a stainless steel spring wire in the form of two straight arm portions disposed at an angle of at least about 30° and joined together by a multi-coiled, integral helical portion to form a highly resilient pivot, an eye formed at the outer end of each arm for connection to a line and sinker, respectively, a hook being connectable to said pivot, there being no other means interconnecting said eyes, whereby said arms may be freely and yieldingly spread apart to form an angle substantially greater than 30° as the result of pull on the line.

References Cited in the file of this patent

UNITED STATES PATENTS

| | | |
|---|---|---|
| 2,108,598 | Burr | Feb. 15, 1938 |
| 2,170,788 | Augenblick | Aug. 22, 1939 |
| 2,227,420 | Augenblick | Jan. 7, 1941 |
| 2,231,616 | Costantino | Feb. 11, 1941 |
| 2,315,295 | Stogermayer | Mar. 30, 1943 |
| 2,352,631 | Guarnieri | July 4, 1944 |
| 2,589,715 | Lysikowski | Mar. 18, 1952 |